Nov. 28, 1961  K. A. ERFURTH ET AL  3,010,648
METHOD AND APPARATUS FOR CONTROLLING RELEASE
OF OBJECTS FROM AIRCRAFT
Filed March 27, 1956  7 Sheets-Sheet 6
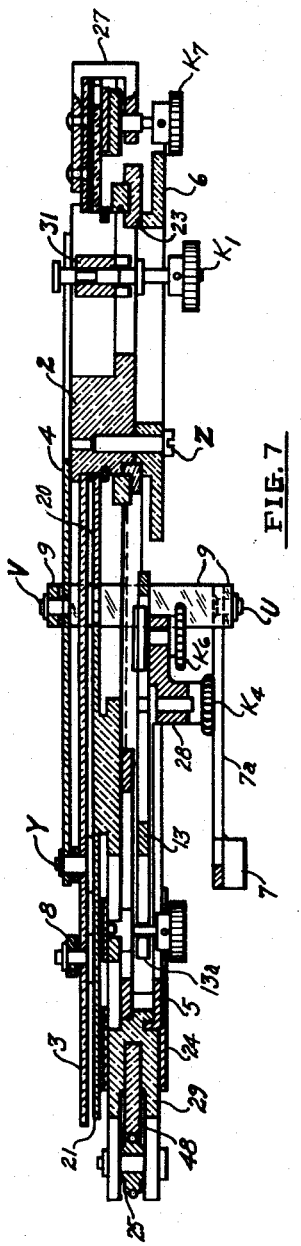
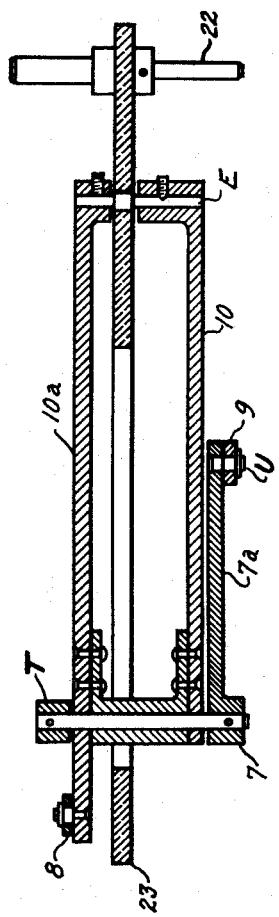
INVENTORS
KURT A. ERFURTH and FRIEDRICH WAZELT
BY
ATTORNEYS

United States Patent Office 3,010,648
Patented Nov. 28, 1961

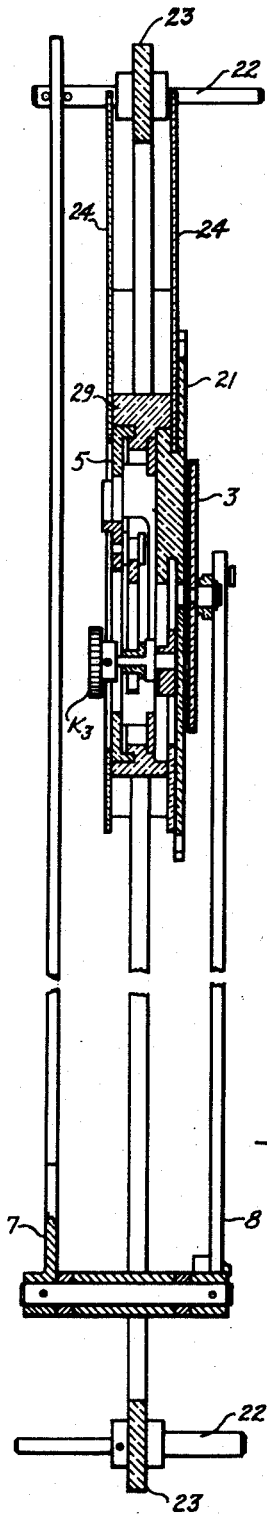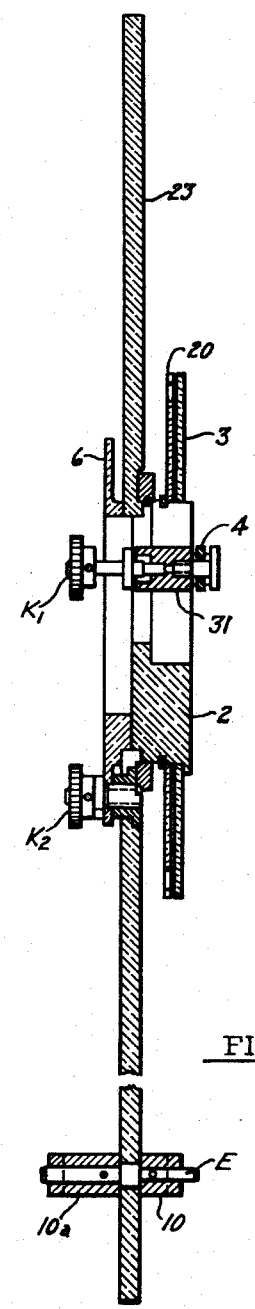

3,010,648
METHOD AND APPARATUS FOR CONTROLLING RELEASE OF OBJECTS FROM AIRCRAFT
Kurt A. Erfurth, Dayton, Ohio, and Friedrich G. Wazelt, Stratford, Conn., assignors to the United States of America as represented by the Secretary of the Air Force
Filed Mar. 27, 1956, Ser. No. 574,343
4 Claims. (Cl. 235—61)
(Granted under Title 35, U.S. Code (1952), sec. 266)

The invention described herein may be manufactured and used by or for the United States Government for governmental purposes without payment to me of any royalty thereon.

This invention relates to aircraft and particularly to the control of the release of material from an aircraft, as for example the dropping of missiles or cargo, or the release of paratroops or other military personnel.

An object of the invention is to provide a novel method of calculating the time and place at which a person or object should be released from an aircraft in flight in order to insure the deposition of such person or object at a predetermined point on the ground or other landing place adjacent to the course being followed by the craft.

A second object is to provide novel apparatus facilitating calculation of the time and place for such a release of persons or objects by positioning the component parts of such apparatus in accordance with procedure embodying the invention.

A third object is to provide calculating apparatus of novel construction lending itself to positioning in a generally vertical attitude above a base point adjacent the positions normally occupied by members of the crew of the aircraft, with the pertinent indicia being readily observable from positions on either side of a central mounting plate or frame, the said pertinent indicia being duplicated or readable in whole or in part from each side of said central plate or frame.

A fourth object of the invention is to provide, as part of the pertinent indicia above referred to, a system of manually shiftable and manually settable links and discs having cooperating scales or index elements facilitating the shifting and setting of said links and discs in positions corresponding to known factors (such as, aircraft speed, wind velocity and direction, distance to the proper point of load release, etc.) entering into the calculations required for determination of the time and place of load release.

A fifth object of the invention is to provide a computing system of the character indicated and characterized by an arrangement of the pertinent indicia in such manner as to facilitate execution of a procedure involving as one of its functional steps the resolution of all pertinent velocity factors into terms of relationship to the true air speed of the craft, and as another of its functional steps, the resolution of all pertinent distance measurements into terms of relationship to the radius of curvature upon which the craft is to be turned, thereby reducing the number of operations required.

A sixth object of the invention is to provide a computing mechanism of the character indicated in which the component parts can be positioned so that all calculations entering into the solution of the problem of determining the correct dropping point are automatically performed in a single operation.

A seventh object of the invention is to provide, as a part of the novel method of procedure above described, the functional step of utilizing, as a simulation of the radius of curvature value, for registration upon the computing apparatus, a dimension corresponding to the dimension representing the magnitude of the true air speed of the craft at the time of the computing operation.

An eighth object of the invention is to provide a computing apparatus of the character indicated, in which the component links and discs are so inter-related as to provide automatically a wind drift correction operation, simultaneously with the course correction operation as well as the automatic transfer of the correction value to an associated element of the apparatus, which element had previously been set to a position representative of the distance from the craft to the pre-selected target point.

A ninth object of the invention is to provide a computing apparatus of the character indicated, and characterized by the incorporation therein of a shiftable wind-triangle with which is associated auxiliary linkage cooperating with said wind-triangle in such manner as to provide a continuing indication of the "time to go," that is, the rate of approach to the cargo release point, as well as a continuing indication of the degree of change in course, corresponding to the indicated drift setting.

A tenth object of the invention is to provide a computing device of the character indicated in which the settable elements representative of the wind-triangle, the release point, and the target range, are each capable of being set by an operation which is independent of the setting operation for each of the other of said settable elements.

An eleventh object of the invention is to provide a computing device of the character indicated in which two of the three pivot points of the wind-triangle carry intermeshing gear elements which are associated with concentric discs constituting complementary indicators of the wind direction and magnitude, each of which discs may be independently adjusted, by releasing it from the associated gear, or may alternatively be coupled to the gear, with a resulting automatic adjustment of the other disc by reason of the said intermeshing relationship of the associated gear elements.

A twelfth object of the invention is to provide a computing apparatus of the character indicated in which the successive setting of the component links and discs will produce an automatic indication of the course correction angle on one side of the vertically disposed assembly when the course correction is to be executed in a clockwise direction, and on the other side of the assembly when the course correction is to be executed in a counter-clockwise direction; the linkages and index scales being duplicated on opposite faces of their respective elements constituting the assembly to facilitate such reading of the indicator results from opposite sides of the assembly, in accordance with the requirements as dictated by the location of the target and the prevailing wind conditions.

These and other objects and advantages of the invention will be better understood upon reference to the following detailed description of the apparatus suitable for carrying into practice the principles of the invention, the said description being composed with reference to the accompanying drawings illustrating the described embodiment of the invention. In these drawings.

Figure 1:
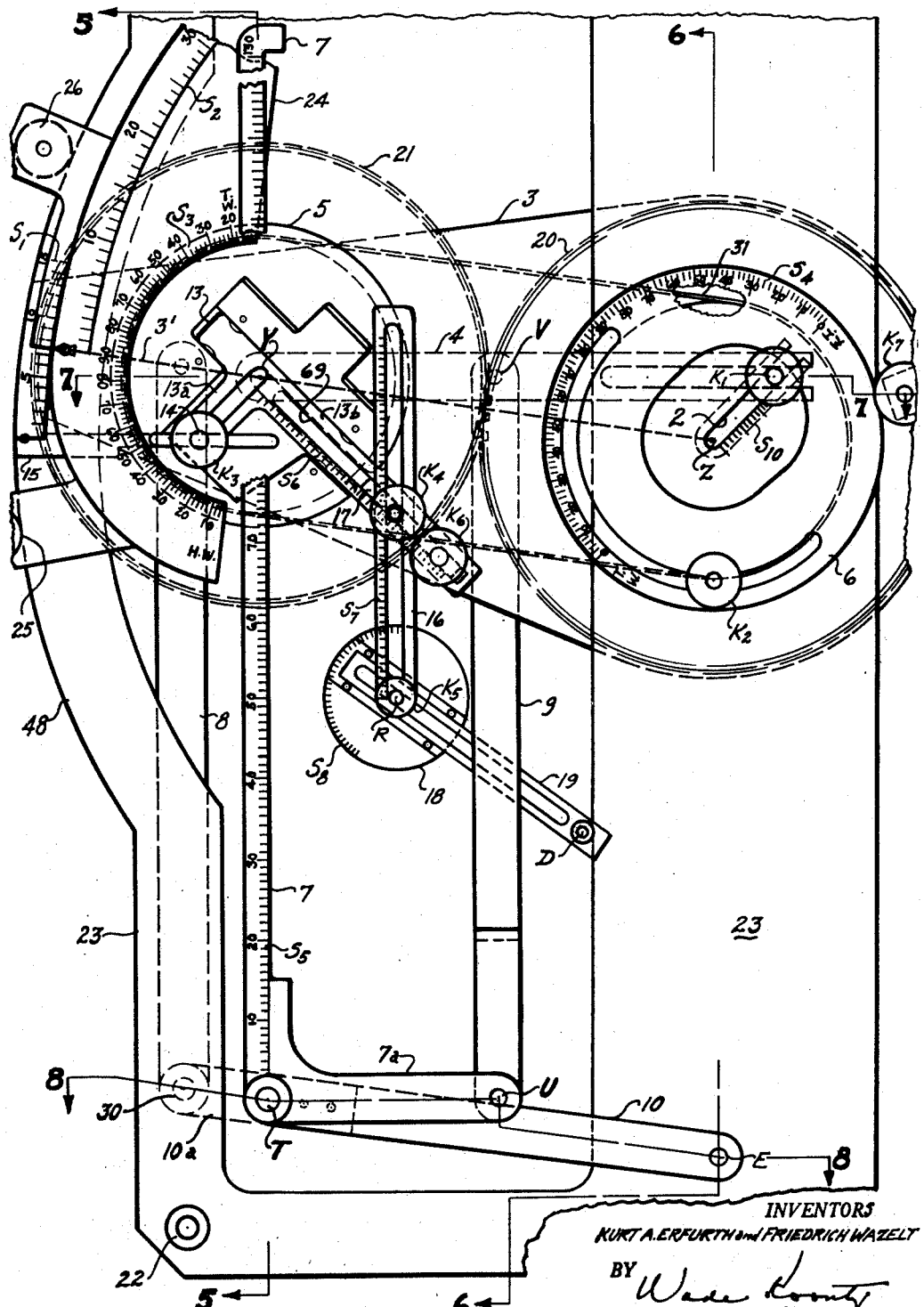
FIG. 1 is a view in elevation of a computing apparatus operable in accordance with a method of operation embodying the invention.
Figure 2:
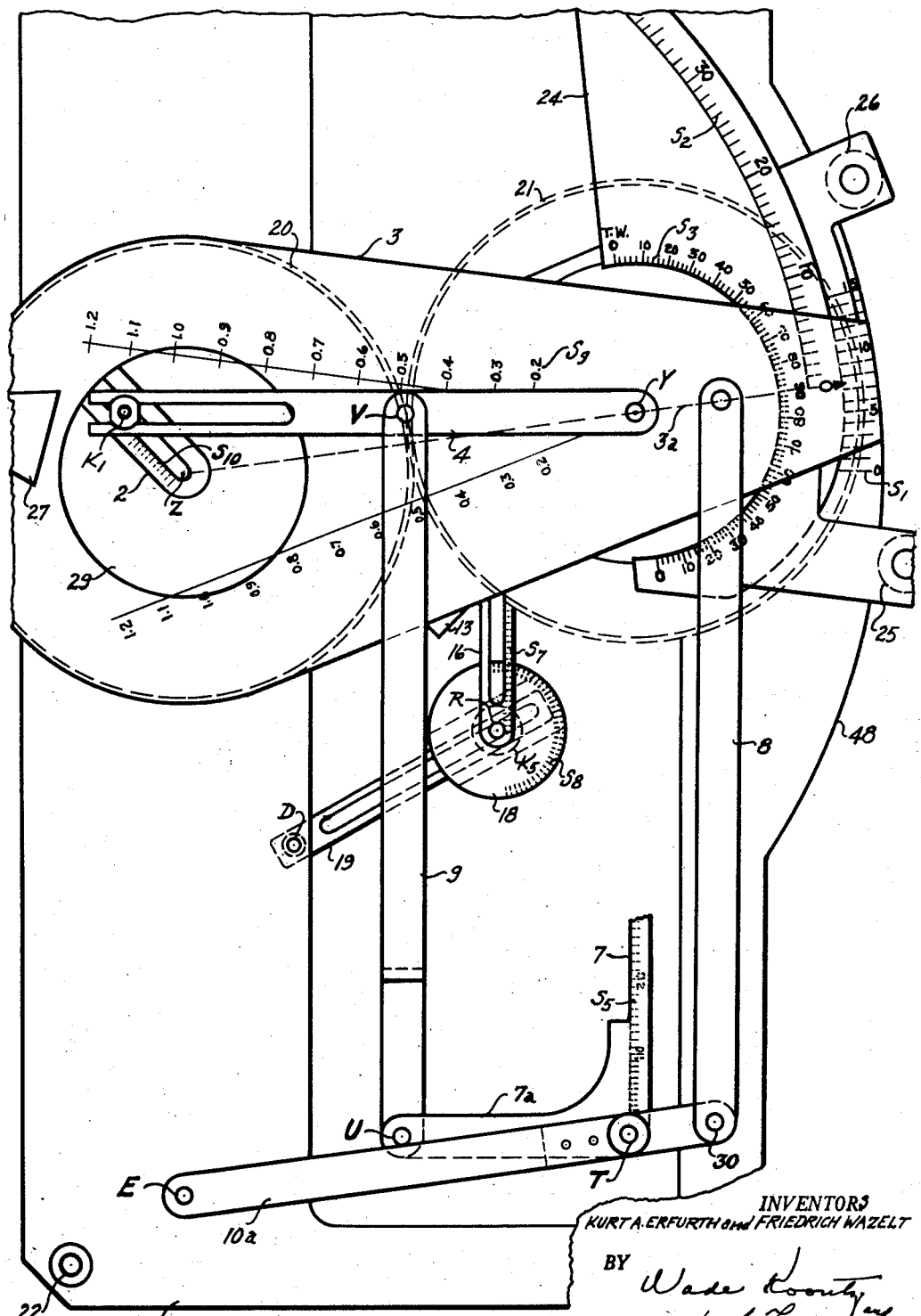
FIG. 2 is a view in elevation of the computing apparatus of FIG. 1, as said apparatus appears when viewed from a direction opposite to the direction of view involved in FIG. 1.
Figure 3:
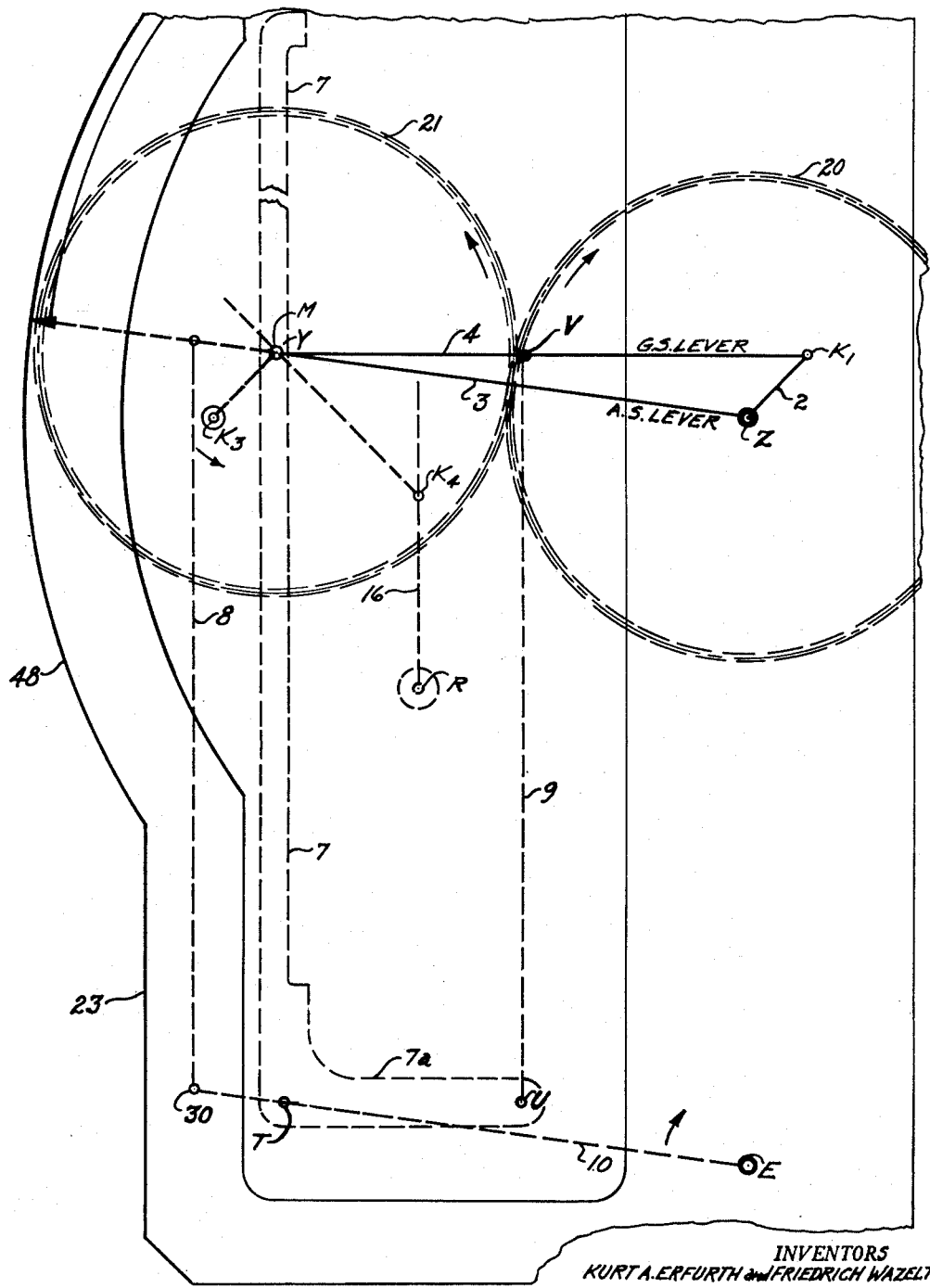
Figure 4:
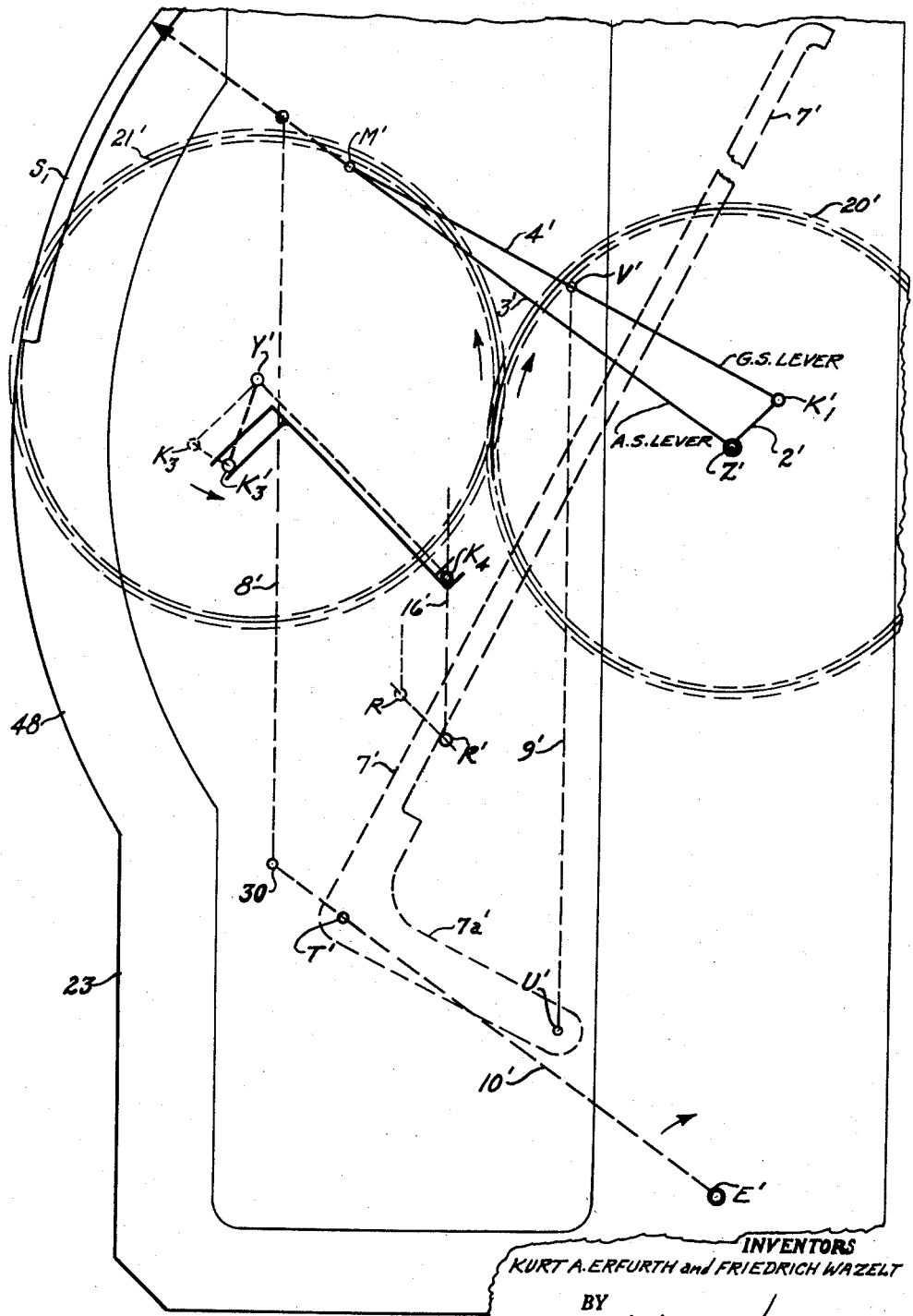
Figure 7A:
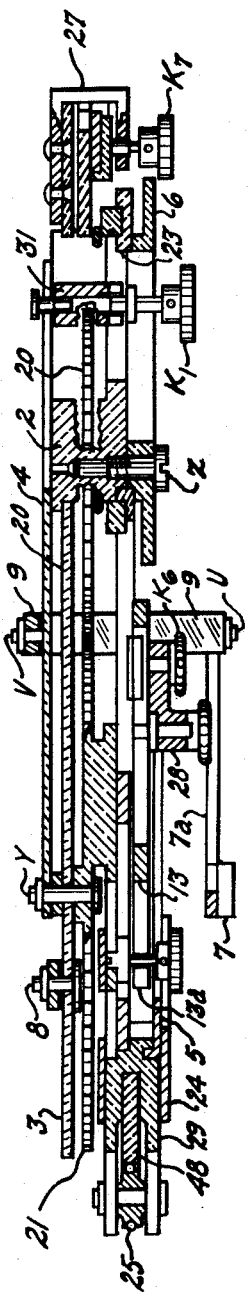

FIGS. 3 and 4 are schematic diagrams illustrating positions assumed by the several components of the complete linkage illustrated in FIGS. 1 and 2, FIG. 3 representing an initial disposition of the component elements and FIG. 4 representing a final position indicative of the degree to which the course of the aircraft is required to be shifted to bring about the release of the material to be dropped in proper time and space relation to the selected target;

FIGS. 5, 6, 7 and 8 are respectively sectional views along the lines 5—5, 6—6, 7—7 and 8—8, respectively, of FIG. 1, and FIG. 7a in an additional sectional view along the lines 7—7 of FIG. 1, except that certain elements, shown in section in FIG. 7 are shown in exterior outline in FIG. 7a.

Referring first to FIGS. 1 and 2, the invention is illustrated therein as incorporated in an assembly of links and discs pivotally mounted in a plurality of related positions appropriately spaced along a generally rectangular mounting panel 23 disposed with its principal surfaces in parallel vertical planes, there being a plurality of indicating scales affixed to each of said principal surfaces, with the scales on one of the surfaces being adapted for use and reference when the direction of the wind force is such as to require course correction maneuvering in a clockwise direction, whereas the scales on the other principal surface are adapted for use when the wind direction is at an angle requiring maneuvering of the craft in a counter-clockwise direction, to achieve a course appropriate for dropping of the personnel or cargo for landing at the selective target. To facilitate maintenance of the mounting panel 23 in the vertical disposition indicated, the panel is provided with bearing assemblies 22 (FIGS. 1, 2 and 5), whose central pins are extended to the degree necessary for rigid support of the panel on suitable corner brackets (not shown), which in turn may be fastened to upper and lower structural elements of the framework of the aircraft upon which the mechanism is installed.

The computing elements, in the embodiment illustrated in FIGS. 1 and 2, include three discs 5, 6 and 18, two having index scales marked thereon, the details of which will be explained hereinafter, and a pair of intermeshing spur gears 20 and 21 concentric with the discs 6 and 5, respectively, and movable therewith under the control of friction coupling devices hereinafter described; also, a cable 31 operatively associated with grooves formed on the peripheries of discs 5 and 6 to produce unitary motion of said two discs under the control of said coupling devices, so that adjusting motion imparted to either of one of said discs will bring about a corresponding rotation of the other. The computing assembly further includes a trio of links 2, 3 and 4 pivotally connected to form a triangular figure adapted to perform the function of a wind-triangle, and for this purpose two of the three pivots of the wind-triangle are chosen to coincide with the centers Y and Z of the discs 5 and 6, respectively, while the third pivot $K_1$ of the triangle is adjustable lengthwise of the slot formed along one end portion of the link 4 so that the navigator may adjust the position of the shorter link 2, to conform to the zero position on the disc 6, when the said disc has been rotated by the action of the intermeshed gears 20 and 21 in reproducing the motion imparted to the disc 5 during the adjustment of the latter disc to bring its index scale reading (representative of the prevailing wind direction) into alignment with the longitudinal axis Y—Z of the link 3. With this arrangement of the wind-triangle the link 3 will represent the true air speed of the craft, and the link 4 the ground speed. As the disc 5 is rotated about the center Y in the operation just described, the movement of bracket 24 bearing the scale $S_2$ in relation to the adjacent scale $S_1$ marked upon the arcuate rim 48 of the panel will bring about an indication of the angle of drift to which the aircraft will be subject at the prevailing direction of wind force application and the prevailing magnitude of the true air speed of the craft; the indicated angle of drift being that corresponding to the scale marking falling in the position of alignment with the longitudinal axis Y—Z of link 3. Thus, as illustrated in FIG. 2, the scale markings "7" and "8" on scale $S_1$ are in straddling relation to the position of alignment with axis Y—Z, therefore a drift angle of approximately 7.5 degrees is indicated by the correspondingly aligned arrow on scale $S_2$. This drift angle corresponds to the angle "$K_1$—Y—Z" shown more clearly in FIG. 3. The computing mechanism also includes a pair of links 8 and 9, the former having its upper end pivoted to link 3 to the left of the point Y, while the link 9 has its upper end pivoted to the link 3 at a point V substantially midway between the ends thereof; also, a link 10 having its right-hand end pivotally mounted at a fixed bearing point E in the mounting panel 23 directly below the pivot point Z constituting the fixed pivot of the above-described wind triangle. The link 10 has additional pivot points 30 and T, the former constituting the point of connection of the lower end of the link 8 while the pivot point T constitutes the connection point for the pivotal joint of a bell-crank type of link 7 having vertical parallelism with the two links 8 and 9, with its outer end pivotally connecting with the link 9, at point U, thereby completing a parallelogram of links whose four pivot points are indicated at Y, T, U and V. Of the four links constituting the described parallelogram, the link 7 has indications marked thereon constituting a scale $S_5$ for indication of the number of time units (for example, seconds) constituting the measure of time interval between the time of commencement of a course correction maneuver and the time at which the personnel or cargo should be released from the craft to insure landing at the selected target point as plotted from the craft at said time of commencement of such course correction.

The computing mechanism further includes a vertically disposed link 16 to which is secured a sled element 17 registering with an elongated slot 69 formed in the arm 13b so that lateral displacement of the arm 13b by means hereinafter described will cause corresponding lateral displacement of the link 16 and thereby produce a corresponding shift of the pivot point R, together with the coupling element $K_5$ and the link 19 slidably mounted on the diametrally slotted disc 18, heretofore described. The various links and indicating elements above described are adapted to be coupled to other elements of the apparatus, for movement in unison therewith, or movement in relation thereto, depending upon whether the coupling elements—herein illustrated as friction-exerting pins or screws—$K_1$ to $K_7$—are turned to the coupling or to the uncoupling position with respect to the adjacent parts adapted to be engaged thereby.

*I. Settings*

The drift angle (angle between ground speed and true air speed) is set by moving the bracket 24 along the arcuate track traversed by rollers 25 and 26 so that the center line of bracket 24 (which represents the zero line of scale $S_2$) is pointing to the proper drift angle on scale $S_1$ affixed to frame 23. The drift angle setting is maintained either by friction, spring-force on the rolls 25, 26 or by clamping of bracket 24 to frame 23. The distance Y—Z (true air speed lever 3) is constant and represents the reference true air speed of magnitude 1.

During drift angle setting the joint Y of lever 3 and ground speed lever 4 is frictionally coupled to the center of disc 5 by means of a releasable connecting mechanism. Disc 5 is centered in bracket 24 at point Y. At the same time lever 7, being a part of the linkage parallelogram T—U—V—Y (see FIGS. 1, 2, and 3) is constrained to remain parallel to E—Z (true vertical attitude) during the setting operation. Both centers E and Z are fixed to frame 23 and the distance E—Z is equal to distance T—Y.

The wind direction with respect to true air speed direction can be set by rotating disc 6 which carries a scale $S_4$ and a knob $K_1$ to facilitate such rotation around axis Z which is fixed to frame 23. This setting is maintained by clamping knob $K_2$ which fixes disc 6 to frame 23. The elliptical opening in this section is provided to facilitate freedom of movement of the knob $K_1$ assembly as the latter follows the motion of the link 4.

The rotation of disc 6 is transmitted by the cable drive 31 to the disc 5, which latter disc is centrally apertured to provide a series of angularly related rectilinear guideways which receive a slide 13 having arms 13a and 13b disposed at right angles, one to the other, so that the arm 13a of slide 13 and arm 13b of slide 13 are, respectively, parallel and perpendicular to the wind direction link 2 of the wind-triangle.

The magnitude of wind is set by positioning knob $K_1$ on the scale $S_{10}$ in such a manner that distance $K_1$—Z represents the ratio of wind speed to true air speed. Knob $K_1$ can slide along the slot of link 4 and can be clamped to it. An extension pin or knob $K_1$ serves as a guide for the ground speed lever 4. The distance Y—$K_1$ represents the ratio of ground speed to true air speed. When the above settings are accomplished the triangle Y—$K_1$—Z represents the wind-triangle during approach before entering into the course correction maneuver. While setting the wind-triangle a pin 14 attached to knob $K_3$ can slide in guide 15 fixed to frame 23 and also in lever arm 13a of slide 13. Slide 13 is guided in disc 5 which is concentric with the arcuate portion of bracket 24. When the wind-triangle is set by clamping of knob $K_1$ then knob $K_3$ is clamped, thus engaging pin 14 with disc 5 and releasing it from guide 15. Therefore, the wind-triangle is also represented by the triangle $K_3$—Y—Z.

II. Distance to target

The preselected distance to target at which the course correction should be initiated is set by adjusting the clamping knob $K_4$ on lever 16 such that distance $K_4$—R represents a quantity which includes the distance to target as one of its factors, while the distance R—D (along link 19) represents the ratio between the radial distance from the craft to the target, on the one hand, and the radius of curvature of the path to be flown to reach such target, on the other. The distance-to-target ($K_4$—R) is readable on scale $S_7$ fixed to lever 16. By clamping knob $K_4$ the lever 16 is rigidly connected to a sled 17 which is free to move in a slot on lever arm 13b.

III. Destination relative to ground path or heading

Disc 18 can be rotated around R so that the angle between lever 7 and slide 19 (fixed to disc 18) represents the angle of divergence of the target, or destination point, from the ground path. Lever 19 which can slide in disc 18 carries a plug D representing the destination, and distance R—D represents the ratio between the radial distance from the craft to the target, or destination, on the one hand, and the radius of curvature of the craft's course, on the other.

The destination setting is maintained by clamping lever 19 to disc 18 (to point R) by means of knob $K_5$. For many practical applications the destination D lies upwind from the target and therefore the destination setting can be simplified. The destination distance upwind is adjusted by sliding lever 16 in the slot of arm 13b and clamping it in the selected position by tightening knob $K_6$. Then the distance Y—$K_4$ represents the ratio $d/r$, wherein $d$ designates the distance to the destination (upwind), and $r$ designates the radius of curvature of the changing course of the craft. This quantity can be taken from a scale $S_7$ mounted on link 16.

IV. Obtaining solution

The course correction computation is performed by swiveling the true air speed lever 3 around the pivot Z. Lever 10 follows this rotation and remains parallel to lever 3. During this motion lever 7, with its horizontal extension 7a, can turn around pivot T, being guided by the steering rods 8 and 9 such that T—U remains parallel to the ground speed lever 4. Therefore, lever 7 which is perpendicular to line T—U, represents a tangent to the resulting ground track of the aircraft during the correction maneuver. The true air speed lever 3 is clamped by knob $K_7$ to spur gear 20, so that gears 20 and 21 operate to rotate disc 5 around point Y. The rotation of disc 5 is translated into a translatory motion of slide 13 thus correcting the destination plug R continuously corresponding to the aircraft drift due to wind during maneuver. In the illustrated embodiment this is accomplished by the inter-action of the rotating pin 14 with the slot of arm 13a, which inter-action forces lever 16, as well as plug R, to move parallel to the direction Y—$K_4$.

The desired solution is obtained when lever 7 comes to rest against the continuously corrected destination plug R (See position $R^1$, FIG. 4). Then the air speed lever 3 will point to the required change of heading on scale $S_2$ which is fixed to bracket 24. The time-to-go ($T^1$—$R^1$, FIG. 4) can be read on scale $S_5$ fixed to lever 7.

The new wind-triangle for the changed heading appears in the form of triangle $M^1$—$Z^1$—$K^1$, (FIG. 4) where point $Z^1$ coincides with original point Z of FIGS. 1 and 3. During the computation phase lever 4 can slide along point $K_1$ and represents at every instant the ratio of ground speed to true air speed, corresponding to the instantaneous heading.

Thus the solutions for heading change, time-to-go, and the new wind-triangle are obtained by a single operation.

FIGS. 5, 6, 7, and 8 show certain structural details more clearly than FIGS. 1 and 2. Thus, for example, FIGS. 5 and 7 show the bearing element 29 supporting the parts 5 and 21 for rotation about their common axis; FIGS. 6 and 7 show the supporting pieces 30 and 28 for the coupling elements $K_1$ and $K_4$, respectively; and FIG. 8 shows how the links 8 and 9 are pivotally connected to the links 10a and 7a, respectively, the link 10a being the counterpart of link 10 on the opposite side of center panel 23. In the foregoing description, the numeral 10 has been used to designate either or both links 10 and 10a, as the context requires.

FIG. 7 also illustrates the offsetting bend in the link 9, which bend permits pivotal connection of the upper and lower ends of the link to the point V and U, respectively, located on opposite sides of the center panel 23.

What is claimed is:

1. In a computing apparatus for determining the point of release for a person or cargo destined for landing at a selected ground station, the combination of a panel mounted in an upright position, a set of rotatable, scale-carrying index elements observable from either side of said panel, said index elements having intermeshing gears integrated therewith to restrain said index elements against mutually independent rotation, a set of three links pivotally mounted on said panel, two of said links being movable with said index elements and the third of said links being movable in relation to said index elements, means for adjusting said links in relation to said index elements in accordance with observations made as to the distance and bearing of the said selected ground station, and also in accordance with air speed, wind force and wind direction, and means responsive to the operation of said last-named means for indicating the degree of change in direction of flight that is required to insure arrival at the proper point for release of the person or cargo to be landed at said selected ground station.

2. A computing apparatus as defined in claim 1, wherein said panel is composed of transparent material to facilitate observation of said links and index elements from either side of said panel.

3. A computing apparatus as defined in claim 1, wherein three of said links are representative of said speed, ground speed, and wind direction, respectively, and wherein a fourth one of said links is representative of the distance to said selected ground station.

4. In a computing apparatus a set of rotatable, drivably inter-meshed, scale-carrying index elements, triangular linkage having pivotal connection with said index elements at their respective axes of rotation, an auxiliary link shiftable laterally of its longitudinal axis in response to rotation of one of said index elements, a fifth link movable toward said auxiliary link and into engagement therewith, and means on said fifth link for indicating the magnitude of the time interval marking the proper point for release of a person or cargo for the purpose of insuring the landing of said person or cargo at a selected ground station.

References Cited in the file of this patent

UNITED STATES PATENTS

| | | |
|---|---|---|
| 970,431 | Davison | Sept. 13, 1910 |
| 2,370,753 | Reece | Mar. 6, 1945 |
| 2,433,249 | Van Sciever | Dec. 23, 1947 |
| 2,505,624 | Molamphy | Apr. 25, 1950 |
| 2,528,502 | De Florez | Nov. 7, 1950 |